United States Patent [19]
Geffroy

[11] 3,840,182
[45] Oct. 8, 1974

[54] EQUIPMENT FOR THE IRRIGATION, TREATMENT AND FEEDING OF SOILS AND PLANTS BY UNDERGROUND DIFFUSION OF FLUIDS

[75] Inventor: Robert Geffroy, Neuilly-sur-Seine, France

[73] Assignee: Sealfire, Grand Duchy of Luxemburg, Luxemburg,

[22] Filed: Apr. 26, 1972

[21] Appl. No.: 247,694

[30] Foreign Application Priority Data
Apr. 26, 1971 France .............................. 71.14844

[52] U.S. Cl. ................................. 239/145, 239/542
[51] Int. Cl. ............................................. A01g 27/00
[58] Field of Search ........... 239/450, 542, 547, 145, 239/271, 272, 63

[56] References Cited
UNITED STATES PATENTS

| | | | |
|---|---|---|---|
| 953,080 | 3/1910 | Wiggins | 239/450 |
| 2,555,201 | 5/1951 | Nordell | 239/145 |
| 2,598,961 | 6/1952 | Andrus | 239/450 |
| 2,798,768 | 7/1957 | Babin | 239/145 |
| 2,807,505 | 9/1957 | Weitzel | 239/145 |
| 3,199,791 | 8/1965 | Chapin | 239/450 |
| 3,302,323 | 2/1967 | Popa | 239/450 |
| 3,438,575 | 4/1969 | Rohling | 239/63 |
| 3,518,831 | 7/1970 | Tibbals, Jr. et al. | 239/542 |
| 3,521,821 | 7/1970 | Emsbach | 239/450 |
| 3,546,884 | 12/1970 | Timpe | 239/53 X |
| 3,587,972 | 6/1971 | Weeth | 239/450 |
| 3,672,571 | 6/1972 | Goodricke | 239/450 |

*Primary Examiner*—Lloyd L. King
*Attorney, Agent, or Firm*—Farley, Forster and Farley

[57] ABSTRACT

The invention has for its object an equipment for the irrigation, treatment and feeding of soils and plants by the underground diffusion of fluids, of which at least one is a liquid, over ground which may exhibit differences in levels, comprising an underground system of distribution of fluids free from products in suspension (irrigation water and/or treatment liquids or gases) in the vicinity of the roots of the plants, characterized in that each point of diffusion of fluid of the system is constituted by a means of extraction of fluid from the system by an access means for the fluid into the ground through a porous wall and by a connection means between the extraction means and the porous wall, at least one of these three means ensuring the control and regulation of the flowrate of the fluid in dependence at least on the supply times of the system, on the level in the said system of the point of diffusion and on the needs of the plants served.

17 Claims, 20 Drawing Figures

EQUIPMENT FOR THE IRRIGATION, TREATMENT AND FEEDING OF SOILS AND PLANTS BY UNDERGROUND DIFFUSION OF FLUIDS

Devices are already known for the irrigation and treatment of plants by underground diffusion of liquids, through the intermediary of underground conduits provided with distribution holes. These installations are unreliable in operation due to the fact of obstructions of these holes by impurities, especially those in the water distributed and those from the ground, and by the action of roots which penetrate up to the distribution holes. In addition, they do not lend themselves to satisfactory distribution over ground of varying levels, and finally they utilize complex, expensive equipment which is awkward to assemble on the land.

The invention has for its object an equipment for the irrigation, treatment and feeding of soils and plants by the underground diffusion of fluids, of which at least one is a liquid, over ground which may exhibit differences in levels, comprising an underground system of distribution of fluids (irrigation water and/or treatment liquids or gases) in the vicinity of the roots of the plants, characterized in that each point of diffusion of fluid of the system is constituted by a means of extraction of fluid from the system by an access means for the fluid into the ground through a porous wall and by a connection means between the extraction means and the porous wall, at least one of these three means ensuring the control and regulation of the flow-rate of the fluid in dependence at least on the supply times of the sytem, on the level in the said system of the point of diffusion and on the needs of the plants served, the liquids diffused having a fluidity approaching that of water and free from any non-liquid element capable of forming deposits which may modify, over a period of time, the passage of liquid through the above-mentioned control and regulation means.

According to one advantage of the invention, the preparation of the points of distribution and their coupling to the system are easy to carry out on the land and they are instantaneous.

An equipment of this kind is totally protected against blocking-up of the distribution holes which have up to the present time limited the development of the known installations, and lends itself well to the stable and durable diffusion of any liquid in a ground having differences in levels.

Various other means complete the invention and examples of construction particularly advantageous in their simplicity and their low cost are given in the description which follows below, reference being made to the accompanying drawings, in which.

Figure 1:
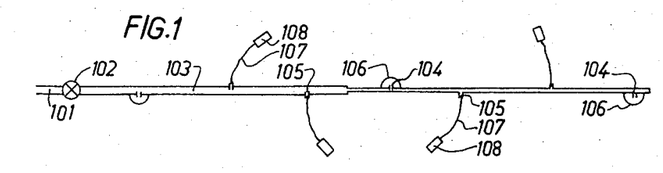
FIG. 1 represents a simplified diagram of an underground liquid-diffusion installation in accordance with the invention.

FIG. 1 shows the most simple diagram of an underground diffusion equipment for liquids according to the invention. A pipe 101 brings a liquid, water for watering or treatment product, under pressure, freed from any non-liquid element in suspension capable of forming deposits in all the passages which control the flow-rate at the diffusion points, for example by means of previous filtering. It is provided with a cock 102 and supplies an underground system 103. On this system, extraction means 104 supply the diffusion points directly through porous walls constituted by porous diffusers 106.

Figures 3A, 3B, 5A, 5B, 5D:
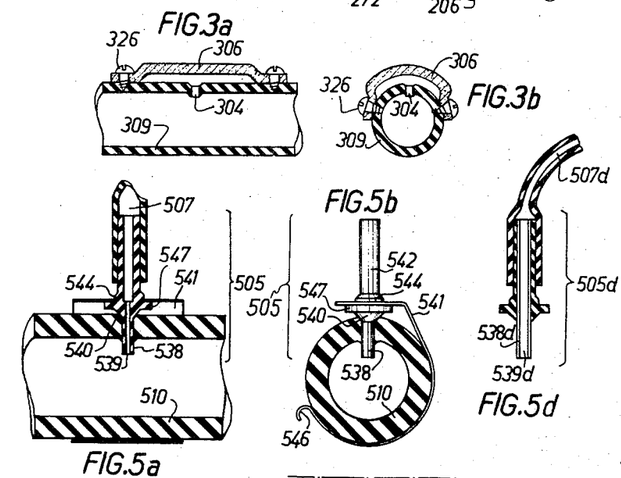
FIGS. 3a and 3b show a means for extraction, control and regulation of flow-rate, constituted by an orifice formed in a pipe of the system discharging underneath a porous cap.
FIGS. 5a to 5c show a means for extraction, control and regulation of flow-rate, constituted by a dosing nipple connection and its method of fixing on a pipe of the system.
FIG. 5d shows a means for extraction, control and regulation of flow-rate constituted by a coupling nipple and a dosing pipe.
Figures 7A, 7B, 9A, 9B, 10A, 10B, 11:
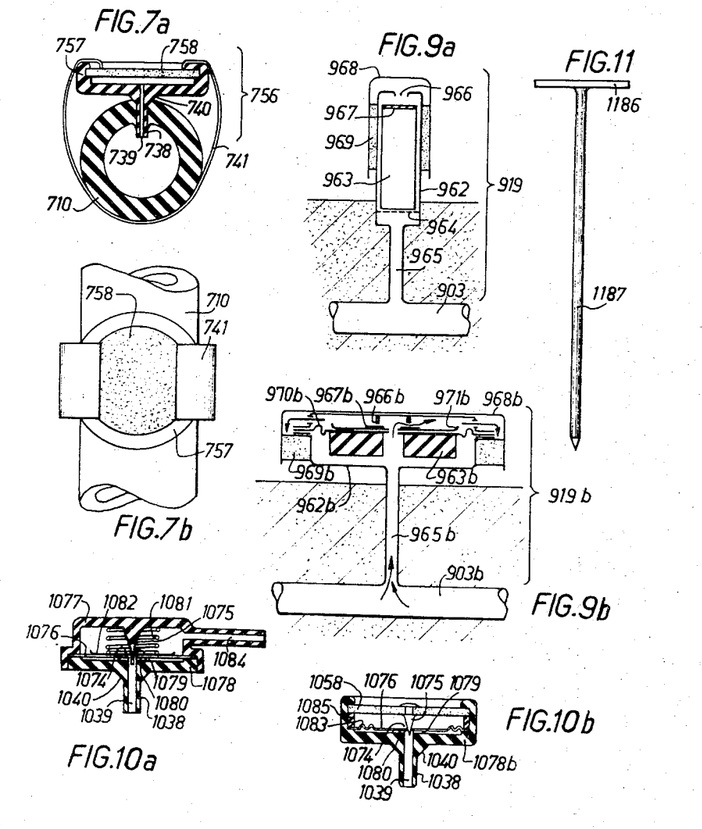
FIGS. 7a and 7b show a porous doser diffusion coupling and its method of fixing on a pipe of the system.
FIGS. 9a and 9b each show an example of construction of an automatic clapper-valve for connecting the system to atmospheric air.
FIGS. 10a and 10b show a dosing nipple coupling and a porous dosing diffuser coupling, each comprising an orifice for cleaning and for automatic compensation of pressure.
FIG. 11 represents a signal for identifying the points of diffusion.

Examples of these are shown in FIGS. 3a and 3b and in FIGS. 7a and 7b. The extraction means 105 supply through connection means 107 the points of diffusion through porous walls constituted by porous diffusers 108.

FIGS. 5a to 5d show examples of extraction means and connection means; FIGS. 6a and 6b show examples of porous diffusers and connection means. The means for controlling and regulating the flow-rate of the liquid at each diffusion point are constituted, depending on the case, by a calibrated orifice or a coupling pipe which is fairly long and of small diameter. or a porous wall having a high resistance to flow, or a combination of these elements, as will be explained later.

Thus, according to the invention, the sensitive points of the installation constituted by the said controlling and regulating means for the flow-rates are fully protected against any risk of deposits and obstruction, since they combine all the conditions necessary and sufficient for that protection, namely;

a. The system is supplied only with a liquid which does not contain any non-liquid element liable to form a deposit in the said means;

b. The porous diffusers 106 and 108 protect the system against any risk of entry of impurities coming from the ground, especially during times of stoppage, when the low diffusers at a lower level drain-off the system by suction in the ground through the top diffusers at a higher level;

c. The porous diffusers protect the said means against the penetration of roots.

Figure 2:
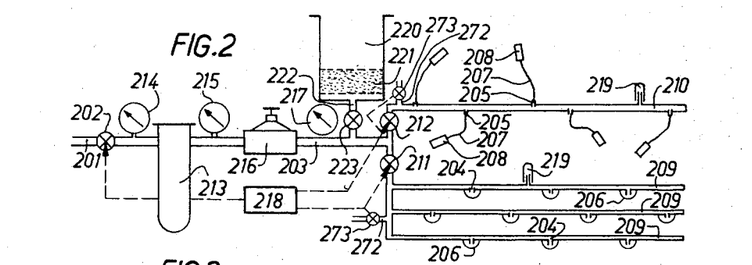
FIG. 2 shows a more complete diagram of an installation for underground fluid-diffusion according to the invention.

FIG. 2 shows the application of the diagram of FIG. 1 to a more complete watering equipment, in which there are again seen the elements of FIG. 1, namely: the incoming conduit 201 for liquid under pressure, the incoming cock 202 and the main conduit 203 of the system. The extraction means 204 and 205 deliver respectively into the porous diffusers 206 and into the tubes 207 of small diameter which each supply a porous diffuser 208.

This basic equipment is completed in FIG. 2 by the following elements:

A filter 213 which is essential when the liquid of the conduit 201 is not free from non-liquid elements capable of forming deposits in the flow controlling and regulating means. This filter is calibrated in order to prevent the passage of all the impurities capable of forming deposits in the said means, for example all impurities of dimensions exceeding $50\mu$ (0.050 mm.); the pressure gauges 214 and 215 act in known manner as devices for detecting any chocking-up of the filter;

A pressure regulator 216 provided with its pressure-gauge 217, which makes the pressure uniform throughout the system, and attenuates in known manner the pressure variations of the supply circuit 201, and also, in a system of the type shown comprising separate sectors 209 and 210, the variations due to the differences in flow-rate of the said sectors. This regulation of the pressure is essential in order to maintain the quantities of liquid diffused within the optimum tolerances when the variations in their inlet pressure or the flow-rates of the various sectors of the system are large;

Separate sectors 209 and 210 controlled by valves 211 and 212 which may be used alternatively in order to maintain the instantaneous flow-rate of the system in relation with the flow-rate available at the intake connection 201. These valves 211 and 212 may be operated by hand or controlled by a programming device or any other regulation means;

A programming device 218 which operates, under pre-determined conditions of frequency and duration, the valves 211 and 212 of the separate sectors, in dependence on the pressure in service of the liquid in the main conduit 203, on the action of the controlling and regulating means of the flow-rates at the diffusion points 206 and 208, and on the requirements of the plants. Any other appropriate means (not shown in this drawing) for example the hygrometry of the ground, the hygrometry of the air, the rain, wind, and also any combination of these various means associated if so desired with the programming device 218, may be employed for the control of the valves 211 and 212 and also for the control of the general system valve 202;

Automatic clapper-valves 219, which are placed at the high points of the separate sectors 209 and 210. They automatically ensure the entry of air at atmospheric pressure into their sector during each stoppage of the flow of liquid in the system, and thus protect the porous diffusers, especially those of the high points of the sector, against being blocked-up by impurities coming from the ground which are drawn-in towards them by the depression due to the drainage of the system through its lower porous diffusers;

A tank 220, placed at a higher level than the highest point of the system to be supplied is coupled to the system, for example at 203, through a filter 221 by a conduit 222 provided with a valve 223. This tank enables the distribution by means of the system of all liquid products for the treatment, improvement, fertilizing of plants and the ground or for the feeding of plants which may be introduced into the tank 220.

It is quite clear that the products to be diffused must be sufficiently diluted so as to have a fluidity in the vicinity of that of water, that the filter 221 should hold back all non-liquid elements capable of forming deposits in the flow controlling and regulating means, and that the said products must not create any risk of formation of deposits of elements which pass through the filter in the dissolved state.

This introduction of liquid-treatment products into the ground by means of the equipment forming the object of the invention, may of course be effected by any appropriate or alternative method. For example, the tank 220 may be under pressure, the treatment liquid may be injected under pressure at any point of the system during its operation with water or alternatively, it may be selectively distributed in sectors.

FIGS. 3a and 3b represent an example of construction of an extraction means (104 of FIG. 1) ensuring direct access of the liquid to the porous diffusers (106 of FIG. 1), in which the flow controlling and regulating means is constituted by the combined action of an orifice 304 pierced in the underground pipe 309 and the porous diffuser 306. The porous diffuser 306 is fixed on the pipe 309 in a fluid-tight manner by any suitable means, for example by screws 326.

Figure 4:
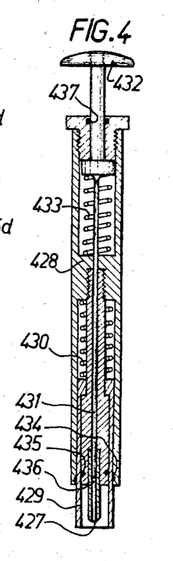
FIG. 4 represents a tool for forming the orifice of FIG. 3a in a polyethylene pipe.

The orifice 304, shown in this case as pierced in a tube 309 of polyethylene, is made with accuracy in a very simple and economic manner by means of a small perforating punch shown in FIG. 4, comprising a perforating tube 427 mounted on a handle 428 and protected by a retractable cover tube 429, held in its external position by a spring 430. An extractor 431, actuated by a push-rod 432 against a spring 433, drives out the material cut-out by the perforating tool 420. With this tool, the perforating punch 427, even of very small section, for example from 0.5 to 1.5 mm., pieces clean and uniformly-calibrated holes in a polyethylene tube. The cylindrical punching may be expelled after each operation by depressing the push-rod 432, which is essential to the correct formation of the following hole, and the retractable tube 429 protects the perforating tube, which is fragile, against any damage.

Joints 434, 435, 436 and 437 of self-lubricating material are preferably provided so as to protect the mechanism against any inlet of earth, water, dust or other impurities, in order to permit its use on site without any special precautions. A tool of this kind makes it possible to pierce on site in the system, the orifices required by the positions of the plants to be served under perfect conditions of precision and in a very short time, of the order of one second per hole.

Figure 5C:
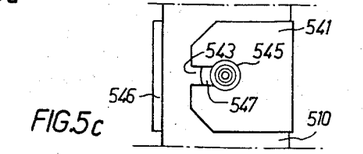
Figures 6A, 6B, 6C, 8:
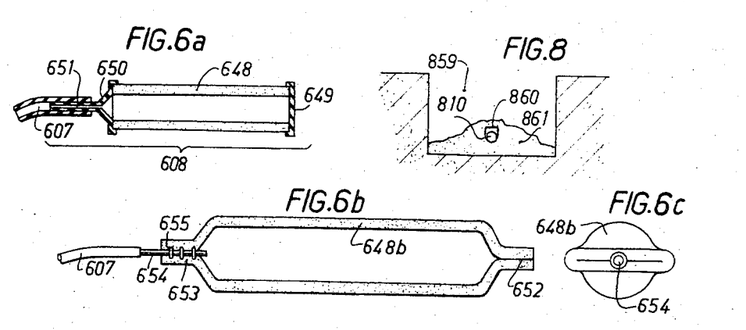
FIGS. 6a and 6b show two examples of porous diffusers.
FIG. 6c is an end view of the diffuser shown in FIG. 6b.
FIG. 8 represents a porous diffuser arranged in a heap of sand.

FIGS. 5a to 5d show an example of construction of an extraction means (105 of FIG. 1), of its fixing and of a coupling nipple. In FIGS. 5a, 5b and 5c, this means is combined with the flow-controlling and regulating means. The part 505 which they represent is therefore a dosing coupling nipple, whereas the part 505d of FIG. 5d is only a coupling nipple.

The dosing coupling nipple 505, in co-operation with the pipe 510, of polyethylene for example, effects the connection of a diffusion point, the dosing of the quantity of liquid served at this point and the connection of a flexible pipe leading the liquid to the said point. The dosing coupling nipple 505 comprises a tubular nose 538 of small diameter. Its length preferably exceeds the thickness of the walls of the tube 510 in order that the extraction of liquid may not be affected either by the burrs of the hole edges or by wall turbulence. Its internal section 539 constitutes the flow-dosing orifice while the outer wall, which is introduced into a hole formed in the tube 510, co-operates with the saie tube in order to ensure a fluid-tight coupling.

To this end, the external diameter of the tubular nose 538 is slightly greater, for example by 10 percent, than the diameter of the hole in the tube 510, so that, taking into account the small diameter of the tubular nose 538, this continuous radial grip ensures alone fluid-tightness between the tube 510 and the tubular nose of the dosing coupling nipple 505.

In addition, a cone 540, for example at 45°, coupled to the tubular nose 538, forms its seating on the outer edge of the hole of the tube 510, by the effect of an application force of the dosing coupling nipple 505 against the tube 510 and adds a second fluid-tightness effect to that above. Each of these fluid-tight seals is of high efficiency and their multiplicity has proved by experience, even in the case of mountings carried out on site by unskilled labour, that it offers a complete guarantee of fluid-tightness, and the mounting of these dosing couplings is instantaneous.

The force of application of the dosing coupling nipple 505 on the tube 510 can be effected by any elastic means. A good example is the clip 541 of protected spring steel or of stainless steel. This is mounted by introducing the nipple 542 through an opening 543 in the clip. A base 544 is preferably arranged between the nipple 542 and the cone 540 which co-operates with a hole 545 in the clip so as to prevent movement after mounting. The placing in position of the clip is effected by sliding its rolled edge 546 over the pipe 510, and by its construction it applies a constant gripping force between the pipe 510 and a flange 547.

Thus, after having pierced the pipe 510 with a tool of the kind shown in FIG. 4, which takes a fraction of a second, it is only necessary, in another very short period, to introduce the tubular nose 538 of the dosing coupling nipple into the hole of the pipe 510 and then to snap-on the clip 541 and connect the small flexible pipe 507. The dosing coupling nipple is mounted and fixed without risk of leakage and coupled to the porous diffuser which it supplies.

Finally, removal is just as easy and rapid, which enables the regulation of each diffusion point to be changed when the need for this arises, for example in order to follow the variation of the requirements of plants during the course of their development.

The coupling nipple 505d of FIG. 5d is constituted by a dosing coupling nipple 505 of FIGS. 5a to 5c, in which the calibrated orifice 539 is dispensed with and replaced by an open passage 539d, the flow-rate of which is much larger, under the conditions of pressure of the system, than the flow required for the diffusion point concerned. The controlling and regulating means for the flow is then effected downstream of the coupling nipple and it may be constituted by the coupling tube 507d between the coupling nipple 505d and the porous diffuser which is for example of the type shown in FIG. 6a. The flow controlling and regulating means acts in this case by creating a high-pressure drop in the tube 507d, by giving it a great length and/or a small diameter.

Thus, for example, at a pressure in the system of 1 bar, a coupling nipple 505d of 1 mm. in internal diameter has a flow-rate of water to the open air of about 30 litres per hour. By connecting to the said nipple a small tube of 10 m. in length and 1.5 mm. in internal diameter of polyvinyl chloride, the flow-rate falls to about 3.5 litres per hour.

This flow controlling and regulating means makes it possible to obtain very low rates of flow while avoiding the use of orifices of very small section which remain subject to obstructions in spite of all the precautions taken to prevent these. Furthermore, it is not expensive since these small tubes are of very low cost.

These devices 505 and 505d may be made from any rot-proof material, not subject to corrosion by the elements existing in the ground, and having adequate mechanical strength to prevent the nose 538 or 538d being exposed to the risk of breaking or twisting. The strong mouldable plastic materials are a good example.

The tubular nose of the devices 505 and 505d may also be constituted by a metallic part inserted in a body of the said device which may then be composed of mouldable material of less strength. This is the case with the tubular nose 538d. In addition, a participation by surface treatment or by mixture of a water-repellent product such as a silicone in constituting the internal wall of the dosing orifice 539 may be employed in order to prevent any drops of liquid from remaining in the orifice 539 of the doser during stoppage of the flow, so as to protect the said orifice against deposits of products in solution in the liquid which would be formed during the evaporation of the said liquid.

This participation of a water-repellent product such as a silicone on the walls of any liquid-dosing member, and especially for the dosing of water, has the further advantage or reducing or eliminating the adherence of deposits which may be formed on the said walls.

FIG. 6a shows an example of construction of a porous diffuser. It is formed by a section of porous tube 648 closed at one extremity by a plug 649 and at the other by a plug 650 comprising a nipple 651. This nipple 651 is connected by a small flexible tube 607, the other extremity of which is connected to a dosing coupling nipple 505 or to a coupling nipple 505d.

The porous tube 648 can be made of any rot-proof porous material having a sufficient level of filtration, for example of the order of 50μ (0.050 mm.), and which does not allow roots to pass through. This is the case for example of filtration ceramics and sintered stainless metals. The plugs 649 and 650 may be of plastic material and these three parts may be assembled together by glueing.

FIG. 6b shows another example of construction of a porous diffuser made from a material which can be modelled before being subjected to a finishing treatment. This is the case for example with clay, which can be kneaded, extruded and modelled before baking. A diffuser body 648b is cut-off from an extruded tube and its extremities are then closed, one, 652 in a fluid-tight manner and the other 653, fluid-tight also but including a nipple 654 on which can be connected the tube 607 for connection to a coupling nipple 505d. In order to facilitate fluid-tightness and the retention of the nipple 654 in the contracted walls 653 of the porous diffuser, there may be provided on the nipple, surface irregularities such as the ribs 655.

FIGS. 7a and 7b represent a further example of construction, on the one hand of an extraction means (104 of FIG. 1), combined with a flow-controlling and regulating means, with the means for coupling to the porous wall and with the porous wall itself, the whole assembly constituting a porous dosing coupling diffuser 756 and on the other hand of the fixing of the said porous dosing coupling diffuser.

The porous dosing coupling diffuser 756 comprises the tubular dosing nose 738 and the cone 740, similar in operation to those of the elements 538 and 540 of FIGS. 5a and 5b. They are rigidly fixed on a hollow casing 757 into which discharges the calibrated orifice 739. A porous plate 758 inset in the casing 757 plays the part of a porous diffusion wall. A clip 741 of protected spring steel or of stainless steel applies a retaining force for the porous dosing coupling diffuser 756 on the tube 710.

There are thus found combined in a single member all the elements previously described, constituted by the dosing coupling nipple shown in FIGS. 5a to 5c, the porous diffuser shown in FIGS. 6a to 6c and the tube which connects them together. This porous dosing coupling diffuser makes it possible to use all the sections of the system which have a liquid-conveying function in order to ensure the diffusion of liquid to the plants which are located in their immediate vicinity and to produce at the most accurate cost a general distribution over large surfaces by means of a network of parallel conveying and diffusing branches having a distance apart related to the extent of the diffusion of liquid in the ground around each diffusion point.

This distribution is suitable for the cultivation of plants which occupy a large proportion of the ground, such as maize, cereals, vegetables, grass-turf, flowers. In fact, this porous dosing coupling diffuser is as simple as possible, is instantaneously fixed as quickly and easily as the dosing coupling nipple alone and represents the most economical formula for carrying out its various functions: connection, fluid-tightness, dosing of liquid and diffusion into the ground through a porous wall. In addition, the trench for burying these conduits can be made with a small trench-digging machine with a capacity of 0.20 × 0.30 metre under excellent conditions of speed and cost.

This dosing coupling diffuser in manufactured with the same material as those previously described for the dosing coupling nipple, and the porous material of the plate 754 has the same characteristics as those described for the tube 648 of FIG. 6a.

The resistance to flow of these various porous walls is defined mainly as a function of technical and economic considerations.

Thus, when the desired flow-rates are very small, of the order of a few litres per 24 hours, this result is easily obtained at low cost and with good stability in prolonged service with a porous diffuser of earthenware of the type shown in FIG. 6b, supplied by a coupling nipple 505d and a small tube 607. The porous diffuser alone effects the control of the flow-rate. The losses of pressure in the coupling nipple 505d and the tube 607 will be nil for a flow-rate as small as this.

In order to limit the flow of liquid in the event of breakage of a porous diffuser of this kind having a very low output, it is advantageous to provide between the system and the porous diffuser the greatest possible pressure loss which is compatible with safety against obstructions. A method of achieving this loss of pressure is to combine the smallest possible section of passage in the coupling nipple 505d and in the connection tube 507d. This loss of pressure, even high, has no influence on the flow-rate of the porous diffuser since this flow-rate is always much smaller than the smallest flow which can be obtained by means of the highest possible pressure losses in the coupling nipple 505d and in the connection tube 507d.

For flow-rates of the order of 0.1 to 1 litre per minute, for example, the use of a dosing coupling nipple 505 with a tube 507 and a porous diffuser 608 or alternatively of a porous dosing coupling diffuser 756 is more suitable. The control of the flow-rate is in this case essentially effected by the calibrated orifice 539 or 739, and the loss of pressure across the coupling means and the porous wall is negligible and does not affect the flow-rate in any appreciable manner.

FIG. 8 shows, in a trench 859 formed in the ground and left open, a porous diffuser 860 mounted on a conduit 810 of a system according to the invention and placed in position in the middle of a heap of sand 861. This heap of sand co-operates with the porous diffuser in two ways:

a. by its porosity to water, it widens the one of immediate access of the water supply and thus increases the surface area of the zone in which the water is diffused by the capillary action of the soil. Without this precaution and in certain ground, a supply of underground water at a depth of about 30 cm., even at a low rate of 0.2 litres per minute, causes a narrow, soft, muddy chimney in a few minutes. The feet sink into it when they are placed on it, and many plants cannot stand their roots being subjected periodically to this muddy condition. A heap of sand having a size in proportion to the nature of the ground, to the flow and to the duration of each supply of water, completely avoids this disadvantage;

b. it protects the diffusers against choking-up by preventing them from coming into direct contact with the mud in the ground, and by effecting a pre-filtration in the case of suction from the system through the diffusers.

FIG. 9a shows a view in cross-section of the system 903 of liquid diffusion at its highest point of the sector, to which is connected an automatic clapper-valve 919. This clapper valve comprises a cylindrical body 962 in which moves a float 963 which rests on an abutment such as a grating 964, which prevents the obstruction of the water-supply pipe 965 when at rest.

A seating 966 co-operates with the joint 967 arranged on the top portion of the float. A cover 968, associated with a filter 969, ensures the protection of the clapper against bad weather and the ingress of mud, dust, plants, insects and animals.

When the sector of the system 903 empties itself, the float 963 moves down against its abutment 964 and opens the orifice 966 which ensures the admission of air into the system and keeps it at atmospheric pressure, totally eliminating any suction through the diffusers of the system. As soon as the pressure is restored, the float 963 rises and closes the seating 966.

FIG. 9b shows, in the system 903b, another example of an automatic clapper-valve 919b. It comprises a diaphragm casing 962b, comprising a float 963b pushing a diaphragm 970b open at its centre, which pushes in its turn a plate 971b carrying a joint 967b, also open at their centre, against the seating 966b. The cover 968b holds the top of the diaphragm at atmospheric pressure through the filter 969b and these two members protect the diaphragm valve against bad weather, mud, dust and the ingress of animals and plants. This clappervalve operates during opening in the same way as that preceding, but during closure, it is more powerful since, to the action of the float in applying the valve against its seating is added the action of the pressure of the system on the diaphragm which, due to its surface area, is thus subjected to a large closure force.

On hilly ground, it is possible that sectors of the system may each comprise successions of high and low points. The automatic clapper-valves 219, 919 or 919b must then be either multiplied and arranged at each of the high points of the sector in order to obtain protection of all the diffusers against any suction during the closure of the supply cock of the sector, or coupled to each of these high points.

In this case, another means according to the invention consists of effecting, upon the closure of a sector supply cock, an injection of gas regulated by any known means, preferably under a pressure of the same order as that of the liquid downstream of the control cock of the sector concerned. The gas injection pipes 272 and the cocks 273, FIG. 2, show the means for this injection. The duration of this injection of gas is at least that necessary to obtain a complete drainage of the system in order to eliminate all syphon effects. For installations of small size, a duration of a few minutes is sufficient.

The gas-injection cocks 273 may be controlled manually or automatically, depending on whether the opening and closure of the sectors are themselves effected manually or automatically. The function of the injection of gas may be limited to the action of drainage above described, in which case air or any neutral gas may be utilized. However, this system of injection may also be used with advantage in diffusing regularly periodically or occasionally into the ground any gas having a useful function in the treatment, feeding or development of plants or for the elimination of undesired plants or animals.

FIGS. 10a and 10b show respectively an automatic dosing coupling nipple and a porous automatic dosing diffuser coupling, in which the dosing orifice is constituted by the small clearance between a small orifice 1074 and a regulating needle 1075 which passes through it, the variations in pressure of the system causing a relative movement between them. The small orifice is in the centre of a deformable elastic diaphragm 1076; the needle 1075 is rigidly fixed to the casing 1077 or to the porous wall 1058 and it has a section which increases in the direction of movement of the diaphragm under the action of the pressure.

The dosing device is connected to the system by the tubular nose 1038 and its fluid-tightness cone 1040, and it is held in position by any elastic means, like the porous dosing coupling diffuser of FIGS. 7a and 7b. The tubular nose 1038 is rigidly fixed to a body 1078 or 1078b. The said body comprises at its centre an annular support 1079 which limits the position of rest of the diaphragm 1076. Radial grooves 1080 permit the liquid under pressure arriving through the orifice 1039 to act over the whole surface of the diaphragm.

The diaphragm 1076 must be flexible and must have an inherent elasticity or such as is supplied by a spring, which durably determines its return to the position of rest, in principle against the annular support 1079. To this end, it may be made for example of flexible material, such as an elastomer or plastic material, and in this case, a spring 1081 and a supporting plate 1082 give it the above-mentioned pre-determined position of rest, or alternatively for example, of a very thin elastic metal, preferably with corrugations 1083 in order to increase its flexibility.

The bodies 1077 and 1078 or 1078b are preferably made of moulded plastic material and are assembled by any appropriate means, sticking, welding, or insetting for example. A nipple 1084 enables the automatic dosing coupling nipple to be connected by a coupling tube with the porous diffuser. In the case of FIG. 10b, a porous diffuser 1058 is supported by the annular spacer 1085 on the diaphragm 1076, and the maintenance and the fluid-tightness of this assembly are ensured by the insetting of the casing 1078b.

The operation of these automatic dosing couplings is as follows:

The pressure difference caused in service by the loss in pressure of the liquid when passing through the small clearance between the orifice 1074 and the needle 1075 displaces the diaphragm 1076 from its position of rest against its natural elasticity or that of the spring 1089. This displacement has two effects:

a. It breaks-up any deposit in formation in the regulating orifice, which ensures the automatic cleaning of the orifice;

b. It pushes the orifice 1074 of the diaphragm towards the increasing diameter of the regulating needle 1075, which acts on the flow-rate in the sense contrary to the variation of pressure. If the diaphragm is of expandable material, its inflation by the pressure may increase the central hole; this effect may also be compensated by an increase in diameter of the neelde 1075. Thus, this dosing device effects the automatic compensation of the effect of pressure variations on the rates of flow.

An automatic dosing coupling of this kind simplifies the installation of a system working with differences in levels. For example, for a system having differences in levels of 15 metres, which is supplied at its lowest point with water at a pressure of 2.5 bars, each diffusion point receives water at pressures comprised between 1 and 2.5 bars, that is to say the higher points would deliver 55 percent less than the lower points. With non-automatic dosing devices, the regulation of each diffusion point must correct this difference, whereas the automatic dosing couplings of the type described above automatically align the flow-rates of all the dosing devices of the system on that of the highest diffusion point of the system.

The automatic porous dosing coupling diffuser of FIG. 10b again adds to these advantages the combination in a single contact member of all the means of one diffusion point and of the automation; like the porous dosing coupling diffuser 756, it makes it possible to effect the diffusion of liquid by means of liquid-carrying tubes.

This automatic dosing coupling, whether it carries a nipple or a porous diffuser may, of course, be produced by any alternative method ensuring relative movement between the orifice and the regulating needle, especially with a fixed orifice and a moving needle fixed on the diaphragm, or again with a mobile orifice and regulating needle each carried by a diaphragm, which would increase the sensitivity of the regulation.

Similarly, this dosing coupling may in an alternative form be produced with a regulating needle having a fixed section, in which case, it does not compensate for the variations in pressure, but it continues to be automatically protected against any formation of deposit.

This automatic dosing device may also be utilized to regulate the section of passage of all the diffusion points of one sector while modifying the pressure of the diffused fluid. This utilization for example makes it possible to obtain, with the same underground diffusion system, the irrigation with control orifices of the order of 0.8 sq.mm. in section and diffusion of treatment gas at small rates of flow with control orifices of 0.1 sq.mm. in section.

The various elements of the system according to the invention, with the exception of the clapper-valves 219, 919 and 919b, are preferably buried at a depth sufficient so that they do not interfere with the execution of working of the ground. otherwise, the diffusion points are preferably marked, for example, by means of indication such as signals shown in FIG. 11, consisting of a disc 1186 rigidly fixed on a long rod 1187 of plastic material, of bright colour, placed in the ground above a dosing diffuser having a clearly visible flat disc which can be walked on or rolled over without disadvantage.

The equipment for irrigation and treatment of plants by underground diffusion of fluids described above lends itself particularly well to the diffusion of liquds by the same conduit system on ground having differences in levels, by the effect of efficient protection of the dosing orifices against any obstruction which makes it possible for dosing orifices of very small diameter to be employed for supplying the low points, the high points receiving the same flow-rates by means of larger orifices, in order to compensate for the differences in levels.

The description has only dealt with fixed orifices because their interchangeability is so easy and rapid that it is simpler, during a regulation, to change the dosing device than to effect an adjustment. It is however clear that the invention also concerns the use of adjustable dosing orifices of any known type which would be employed within the framework of the equipment described, especially with the means of the invention for protecting these dosing devices against obstructions.

The quality of manufacture, the accuracy and, maintenance in prolonged service of the section of the calibrated orifice of the equipment according to the invention, the orifices 304, 539, 739 or 1074 for example, are very important, since it is these factors which determine the quantity of liquid delivered at each diffusion point. This justifies the various means of the invention, having for their object to protect the said orifices against any deposits and any obstructions.

When it is not asked of them to ensure the control of the flow-rates by their resistance to flow, the porous materials employed are preferably dimensioned so as to ensure their flow-rate with a low pressure drop, in order to limit to a negligible value the interference of the porous wall on the control of the rates of flow by the calibrated orifice or by the connection tube. In addition, the granular structure of the porous maerials may vary according to the nature of the ground and in particular of the fineness of the neighbouring soil.

Their dimensions must also be defined with respect to the duration of life required from the installation, the content of non-liquid elements in the liquids distributed capable of forming deposits, the nature of the ground around the diffusers, the presence and the size of the protecting heap of sand and with the level of the diffuser with respect to the minimum and maximum levels of the system.

If the requirements of water for the majority of plants are considered, which are of the order of a few litres per day, and the flow-rates ensured by calibrated orifices, even of very small section, for example of the order of 200 litres per day for an orifice of 0.5 mm. at a pressure of 0.1 bar, it is found that an equipment for irrigation by means of flow-rates controlled by calibrated orifices must be of intermittent operation.

In the event of the utilization of a large system, it is necessary to establish the sections of the conveying and conveyor-diffusing conduits required to work simultaneously, in order to limit the pressure losses in service to within the tolerances corresponding to the tolerances of the pre-regulated flow-rates of the various dosing devices. This necessity faced with the lower cost of the equipment makes necessary, except for small installations, a system with decreasing sections of conveying and conveyor diffusing conduits.

The internal section of the small tubes 107, 207, 507 and 607 is preferably very small, of the order of 2.5 mm., which makes it possible to obtain very economical and flexible tubes of flexible plastic material with a wall thickness of the order of 1 mm., easy to install, rot-proof and resistant to crushing. Exceptionally, when the diffusers are utilized to supply large plants, trees for example, by means of a tapping on the conveyor conduit having a limited time of operation, these small tubes have a larger internal diameter.

The present invention has been described and illustrated only by way of a preferred example. Equivalents may be made in its constituent parts without thereby departing from its scope which is defined in the appended claims.

I claim:

1. Underground equipment for the underground irrigation, treatment and feeding of soils and plants by underground diffusion of fluids, on ground which may have different levels, having at least one cock controlling an underground piping system for underground distribution of fluids in the vicinity of the roots of the plants, comprising a plurality of underground fluid diffusion points located along the piping system each having controlling and regulating means, extraction means, and underground porous means providing underground access for the fluid into the ground, said controlling and regulating means determining the flow rate at each point.

2. Equipment according to claim 1, wherein the controlling and regulating means comprise a calibrated orifice.

3. Equipment according to claim 1, wherein said controlling and regulating means comprise a coupling tube of small cross section arranged between the extraction means and the porous means.

4. Equipment according to claim 1, wherein aid controlling and regulating means comprise the internal resistance to flow of said porous means.

5. Equipment according to claim 4, wherein the controlling and regulating means includes said extraction means and a coupling tube at least one of which being adapted to restrict flow in the event of loss of said porous means.

6. Equipment according to claim 2, wherein the orifice internal wall surface includes a water repellant silicone.

7. Equipment according to claim 2 wherein said extraction means comprises a nipple having said orifice therein and sealingly inserted through an aperture in the piping wall, said extraction means including resilient means to retain sealing engagement of the nipple with the piping wall.

8. Equipment according to claim 2 wherein the extraction means comprises a nipple sealingly inserted through an aperture in the piping wall and having said orifice therein, said extraction means including integral coupling means engaging the porous means and resilient means to retain sealing engagement of the nipple with the piping wall.

9. Equipment according to claim 1 wherein said controlling and regulating means comprises a calibrated orifice and regulating needle located therein adapted for relative movement therebetween in response to changes in the flow of fluid in the piping system.

10. Equipment according to claim 9, wherein the regulating needle and the orifice cooperate to provide decreasing orifice opening with increasing fluid pressure in the piping system.

11. Equipment according to claim 1, including at least one clapper valve located at a relatively high elevation in the piping system and comprising an orifice venting the piping system to the atmosphere and a clapper adapted to close the orifice upon fluid pressurization of the piping system, said clapper valve also including filter means adapted to prevent the ingress of contaminants from the atmosphere.

12. Equipment according to claim 1, including a source of pressurized gas connected to the piping system downstream of said cock controlling the supply of fluid and a gas inlet cock adapted to control the flow of said pressurized gas to the piping system.

13. Equipment according to claim 12 wherein the gas-inlet cock is controlled by automatic means adapted to open the gas inlet cock for a preset time upon the closure of the fluid supply cock.

14. Equipment according to claim 1, wherein a filter is provided at the inlet of said piping system.

15. Equipment according to claim 1, including a pressure regulator connected to the piping system and adapted to control the supply pressure of fluid to the system thereby compensating for pressure variations in the system.

16. Equipment according to claim 1, including a source of fluid treatment materials connected to the piping system and a valve in said connection adapted to control the admittance of the treatment materials to the piping system.

17. Equipment according to claim 1, wherein marking means indicate the positions of said diffusion points.

* * * * *

UNITED STATES PATENT OFFICE
CERTIFICATE OF CORRECTION

Patent No. 3,840,182     Dated October 8, 1974

Inventor(s)  ROBERT GEFFROY

It is certified that error appears in the above-identified patent and that said Letters Patent are hereby corrected as shown below:

Col. 5, line 10, change "saie" to read --said--

Col. 8, line 27, change "one" to read --zone--

Col. 10, line 42, change "neelde" to read --needle--

Col. 13, claim 4, first line, change "aid" to read --said--

Signed and sealed this 31st day of December 1974.

(SEAL)
Attest:

McCOY M. GIBSON JR.
Attesting Officer

C. MARSHALL DANN
Commissioner of Patents